United States Patent
Iwata et al.

(10) Patent No.: US 6,205,970 B1
(45) Date of Patent: Mar. 27, 2001

(54) ENGINE BALANCE SHAFTS SUPPORTING STRUCTURE

(75) Inventors: Kazuyuki Iwata; Tomonori Niizato, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/372,177

(22) Filed: Aug. 11, 1999

(30) Foreign Application Priority Data

Aug. 12, 1998 (JP) .................................................. 10-228150

(51) Int. Cl.$^7$ .................................................. F02B 75/06
(52) U.S. Cl. .................................................. 123/192.2
(58) Field of Search ........................... 123/192.2; 74/603, 74/604

(56) References Cited

U.S. PATENT DOCUMENTS 5,535,643 * 7/1996 Garza ................................. 123/192.2
5,791,309 * 8/1998 Yamazaki et al. ................. 123/192.2

FOREIGN PATENT DOCUMENTS 6-017879 * 1/1994 (JP) .

* cited by examiner

Primary Examiner—Noah P. Kamen
Assistant Examiner—Hyder Ali
(74) Attorney, Agent, or Firm—Armstrong, Westerman, Hattori, McLeland & Naughton, LLP (57) ABSTRACT

A casing accommodating therein a pair of balance shafts below the cylinder block comprises an upper casing and a lower casing that can vertically be split, and an oil pump body is molded integrally with one of the upper and lower casings. In addition, one end of each of the two casings is inserted into the oil pump body for support therein, and the two balance shafts are each supported on a bearing provided between the two casings in such a manner as to be split into two halves at an intermediate portion or the other end thereof. With this construction, the oil pump body can be molded together with the casing, thereby making it possible to reduce the number of components used and man hours for assembling. In addition, since the bearings can be split into two halves, when compared with other portions of the balance shafts, the journal portion can be thinned, thereby making it possible not only to reduce the sliding friction but also to make the casing smaller in size and lighter in weight. More over, the degree of freedom of designing balance shafts can also be improved. With the balance shaft supporting structure for an engine the durability of a balancer, as well as the degree of freedom of designing the same are improvided without making the engine larger in size and increasing the number of components used.

11 Claims, 9 Drawing Sheets

ENGINE BALANCE SHAFTS SUPPORTING STRUCTURE

BACKGROUND OF THE INVENTION

1. Field of the Invention

The present invention relates to an engine having balance shafts disposed below a cylinder block, and more particularly to a supporting structure for the balance shafts of the engine.

2. Description of the Related Art

There have been existing heretofore engines having a balancer below the cylinder block (for instance, refer to the Japanese Patent Unexamined Publication (Kokai) No. Sho. 63-106443). In an engine of this type, the balancer comprises a pair of balance shafts supported on a casing disposed in an oil pan below the cylinder block. The balance shafts are intermeshed with each other, and the driving force of a crank shafts is transmitted therefrom to one of the balance shafts via a chain or the like, whereby the two balance shafts are rotated at twice the crankshaft revolution speed in opposite directions.

On the other hand, in the above construction, an oil pump is also disposed below the engine closer to the balancer with a view to making it smaller. To make this happen, it is desirable that the balancer casing and the oil pump body are made integral with each other.

In general, the aforementioned balancer shafts are supported at a plurality positions. With a large-diameter journal portion of the balance shaft that is rotatably supported by a bearing thereof, when rotating, the speed is increased at which the journal portion rotates while in sliding contact with the bearing, and since this causes the bearing and journal portion to get worn largely, it is preferable to make the diameter of the journal portion as small as possible to such an extent that the strength thereof can be secured.

As disclosed in the official gazette of Japanese Patent Unexamined Publication (Kokai) No. Hei. 9-210135, however, in a construction in which balance shafts are inserted from an axial direction, it is at least needed that a journal portion is made to have the largest diameter.

To cope with this, it is considered that a casing as described above and bearings for the balance shafts are divided in two halves in vertical directions, but when the entirety of the balancer is constructed to be so divided, an oil pump body cannot be molded integrally with the casing and therefore it has to be retrofitted, this leading to a drawback of increasing the number of components and assembling man hours.

On the other hand, it is possible that two casing halves including an oil pump body and an oil pump cap are subassembled and that thereafter mounting surfaces to the cylinder block of such a sub-assembly are processed, but this deteriorates the workability. Therefore, it is desirable that a mounting surface of each component to the cylinder block be processed, but this tends to cause processing errors and in a worse case, the balance shafts incline and this causes partial wear.

SUMMARY OF THE INVENTION

The present invention was made in view of the problem inherent in the prior art. It is a first object of the present invention to provide a balance shaft supporting structure for an engine that can improve the durability of a balancer, as well as the degree of freedom of designing the same without making the engine larger and increasing the number of components used. It is a second object of the present invention to provide a balance shaft supporting structure for an engine that can prevent partial wear of a balance shaft without deteriorating the workability in assembling.

According to the present invention, the first object can be attained by providing a balance shaft supporting structure for an engine having disposed therein a casing accommodating therein a pair of balance shafts below a cylinder block thereof, characterized in that the casing comprises an upper casing and a lower casing that can vertically be split, in that an oil pump body is molded integrally with one of the upper and lower casings, in that one end of each of the two casings is inserted into the oil pump body for support therein and in that the two balance shafts are each supported on a bearing provided between the two casings in such a manner as to be split into two halves at an intermediate portion or the other end thereof. With this structure, since the oil pump body can be molded together with the casing and one of the bearings can be split into two halves, when compared with other portions of the balance shafts, the journal portion can be thinned to such an extent that the strength thereof can be secured.

In addition, the second object can be attained by molding an oil pump body integrally with the lower casing, fastening the upper and lower casings to the cylinder block with a first fastening means, and fastening an oil pump cap attached to the oil pump body from a side opposed to the upper casing to the cylinder block with a second fastening means. This structure can allow the distance between the first and second means to be lengthened as long as possible, thereby making it easy to absorb errors.

DETAILED DESCRITION OF THE PREFERRED EMBODIMENTS

Referring to the accompanying drawings, a preferred mode of implementation of the present invention will be described in detail below.

Figure 1:
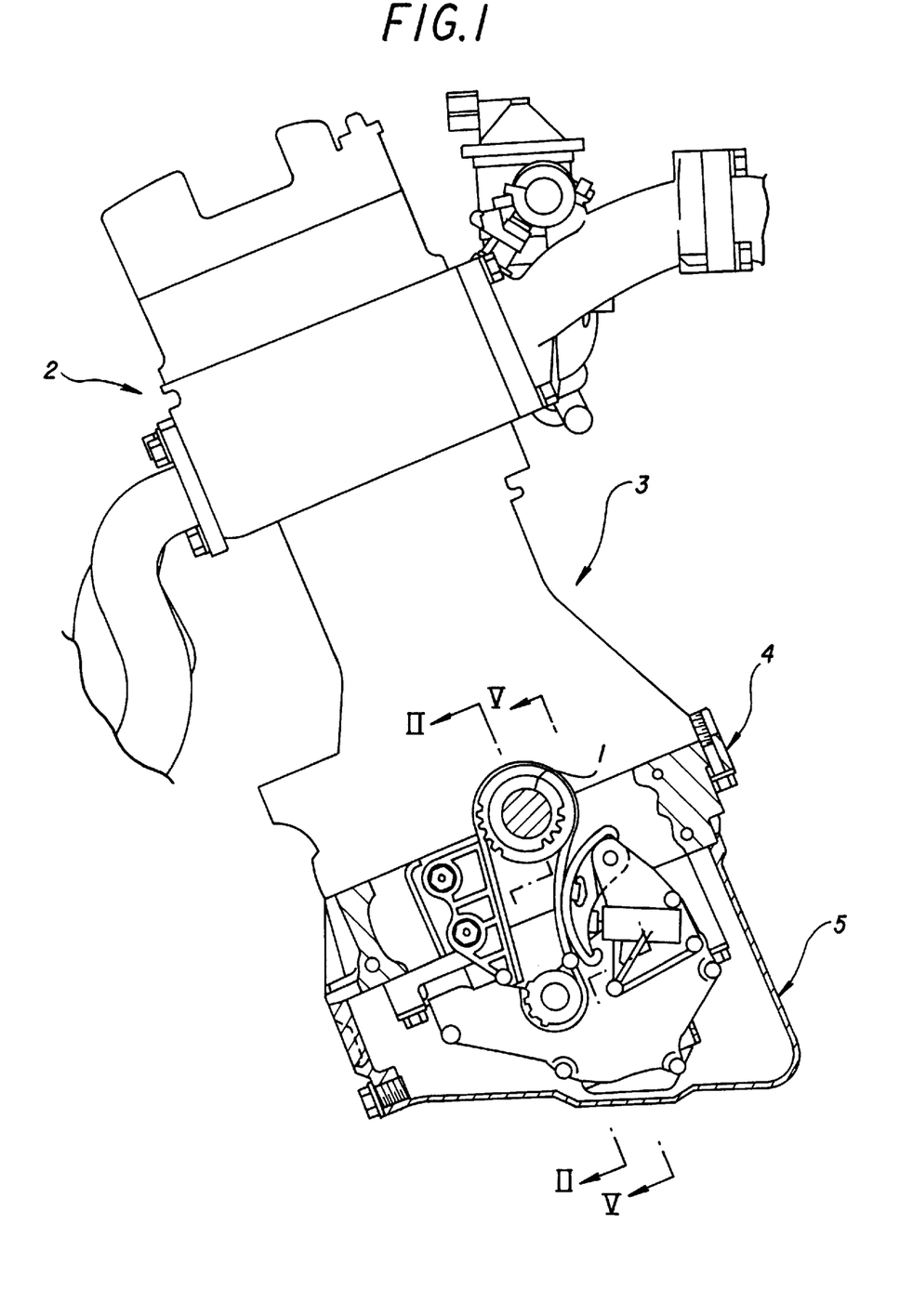
FIG. 1 is a vertical sectional view showing a main part of an engine.
Figure 2:
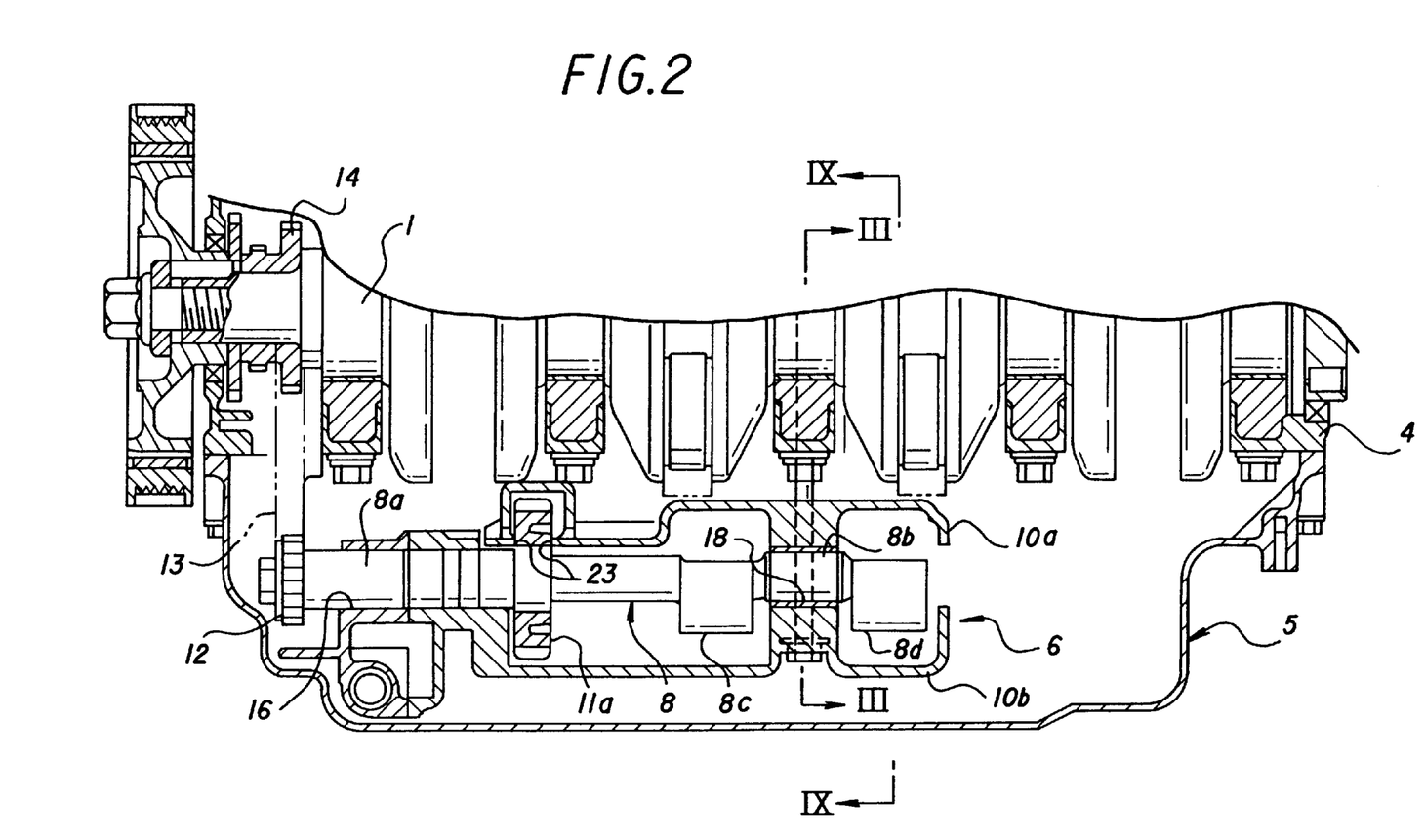
FIG. 2 is a sectional view taken along the line II—II of FIG. 1.

FIG. 1 is a vertical sectional view of a main part of an engine, and FIG. 2 is a sectional view taken along the line II—II of FIG. 1. An engine E is an in-line four-cylinder engine in which four cylinders are disposed substantially in a perpendicular direction and in which a crankshaft 1 is disposed in a horizontal direction. A main body of the engine comprises a cylinder head 2, a cylinder block 3 connected to a lower surface of the cylinder head, a lower block connected to a lower surface of the cylinder block 3 and an oil pan 5 connected to a lower surface of the lower block 4. A journal portion of the crankshaft 1 is rotatably supported on a bearing formed between the cylinder block 3 and the lower block in such a manner as to be split into two halves.

A secondary balancer device 6 for reducing secondary vibrations and an oil pump 7 comprising a trochoidal pump are integrally provided on the lower surface of the lower block 4.

The secondary balancer device 6 comprises a pair of balance shafts 8, 9, a upper casing 10*a* and a lower casing 10*b*, the upper and lower casings being adapted to support and receive those balance shafts 8, 9. The balance shafts 8, 9 are intermeshed to each other with gears 11*a*, 11*b*, and the driving force of the crankshaft 1 is transmitted to them via a sprocket 12 provided at one end of the balance shaft 8, an endless chain 13 and a sprocket 14 provided at one end of the crankshaft 1, whereby the respective balance shafts 8, 9 are adapted to be rotated in opposite directions at twice the revolution speed of the crankshaft 1.

First journal portions 8*a*, 9*a* and second journal portions 8*b*, 9*b*, each of which has a relatively small diameter, are provided in the vicinity of one end and the other end of the respective balance shafts 8, 9, respectively. In addition, balancer weights 8*c*, 8*d*, 9*c*, 9*d* are provided on the side of the other end and the respective balancer weights are divided into two axially longitudinal front and rear halves.

Here, bearings 16, 17 for the first journal portions 8*a*, 9*a* are formed substantially as a hole in an oil pump body 7*a* constituting a part of the lower casing 10*b*, which will be described later. In addition, bearings 18, 19 for the second journal portions 8*b*, 9*b* provided at intermediate portions of the respective balance shafts 8, 9 are metallic bearings which are each split into halves and are formed by aligning the upper casing 10*a* and the lower casing 10*b*. With this construction, when the respective balance shafts 8, 9 are received in between the upper and lower casings 10*a*, 10*b*, first, the respective balance shafts 8, 9 may be inserted into the bearings 16, 17, respectively, at one end thereof so as to be placed on the respective split halves of the bearings 18, 19 on the side of the lower casing 10*b*, and then the upper casing 10*a* may be assembled onto the lower casing so as to align therewith. Thus, this allows the respective journal portions 8*a*, 9*a*, 8*b*, 9*b* to be thinned to such an extent that their strength can be secured. This, in turn, allows the sliding friction between the respective journal portions 8*a*, 9*a*, 8*b*, 9*b* and the respective bearings 16 to 10 to be reduced, thereby making it possible to make the casing smaller in size and lighter in weight. Furthermore, the second journal portions 8*b*, 9*b* may be formed at the other end portion of the respective balance shafts 8, 9.

Figure 3:
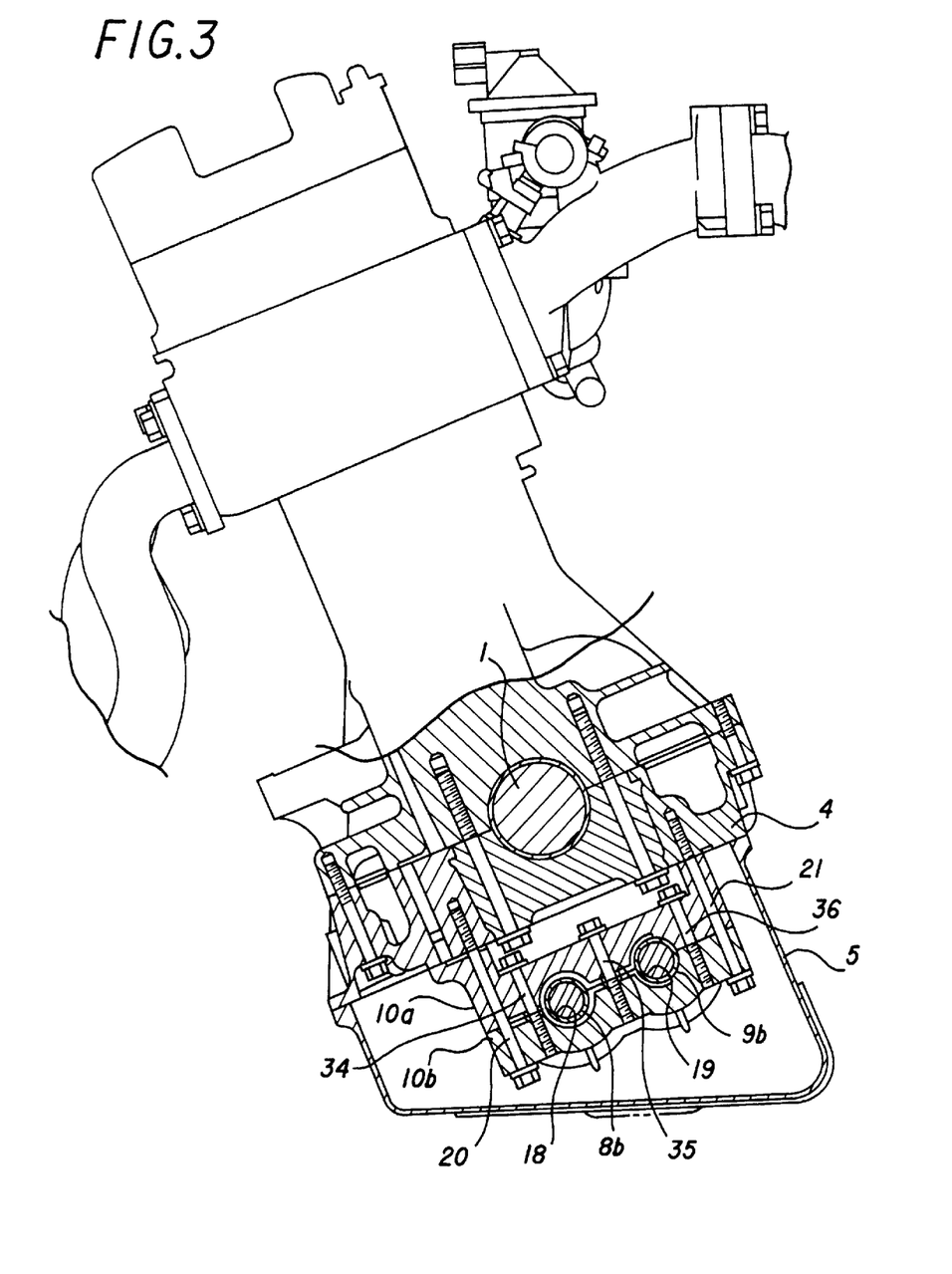
FIG. 3 is a sectional view taken along the line III—III of FIG. 2.
Figure 4:
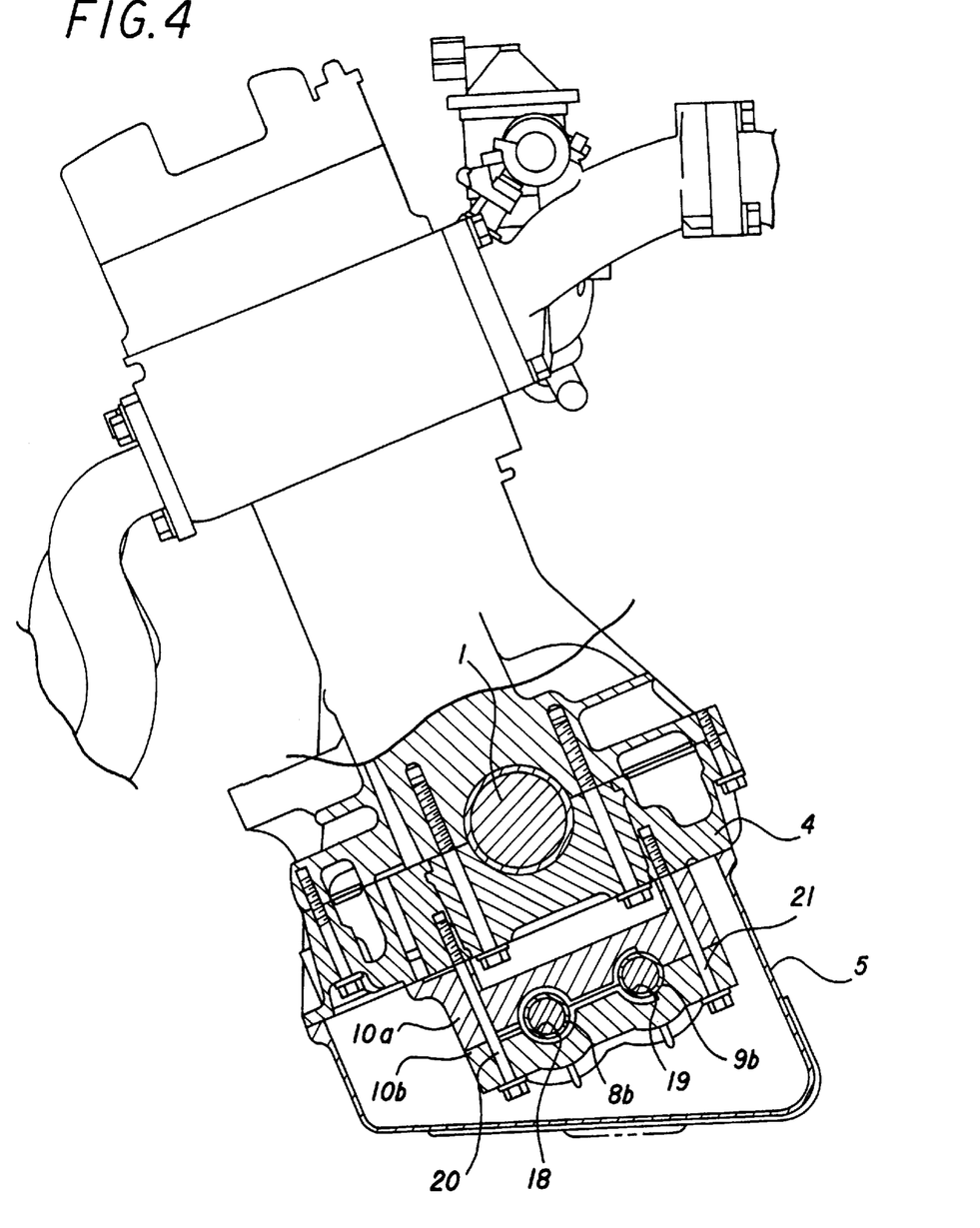
FIG. 4 is a drawing similar to FIG. 3 showing a modified example of a mode of implementation of the present invention.

As shown in FIG. 3, the upper and lower casings 10*a*, 10*b* assembled together by casing fastening bolts 34, 35, 36 functioning as a third fastening means. The upper and lower casings 10*a*, 10*b* thus assembled are then fastened to the lower block 4 with through bolts 20, 21 functioning as a first fastening means. At this time, the casing fastening bolt 35 is disposed between the bearings 18, 19 for the balance shafts 8, 9 which are provided at an intermediate portion of the pair of balancer weights. As shown in FIG. 4, when this fastening is carried out, if the upper and lower casings 10*a*, 10*b* are directly fastened together to the lower block 4 with the through bolts 20, 21, the number of components and assembly man hours can be reduced.

Figure 5:
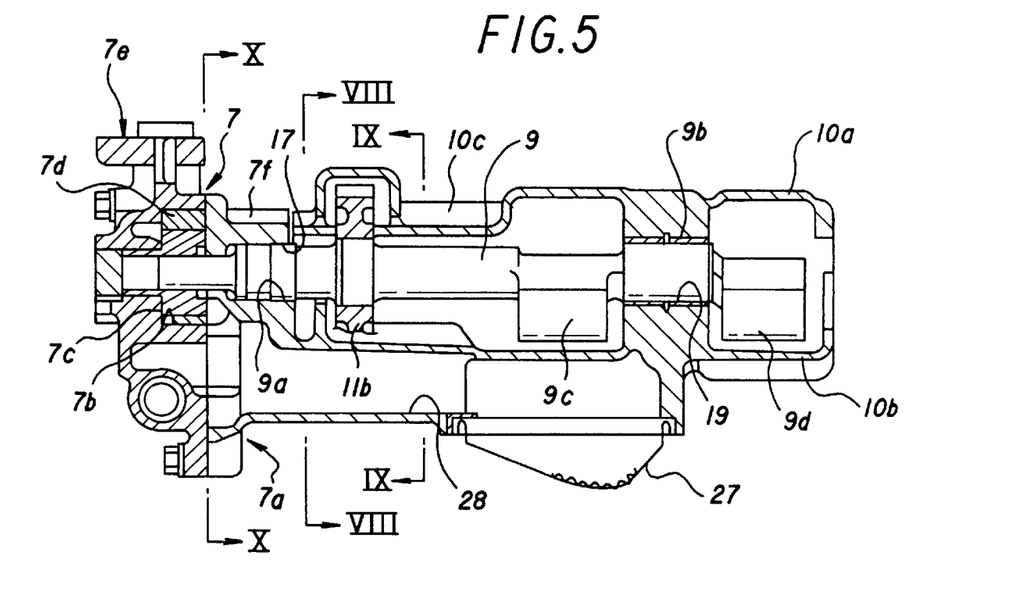
FIG. 5 is a sectional view taken along the line V—V of FIG. 1.
Figure 7:
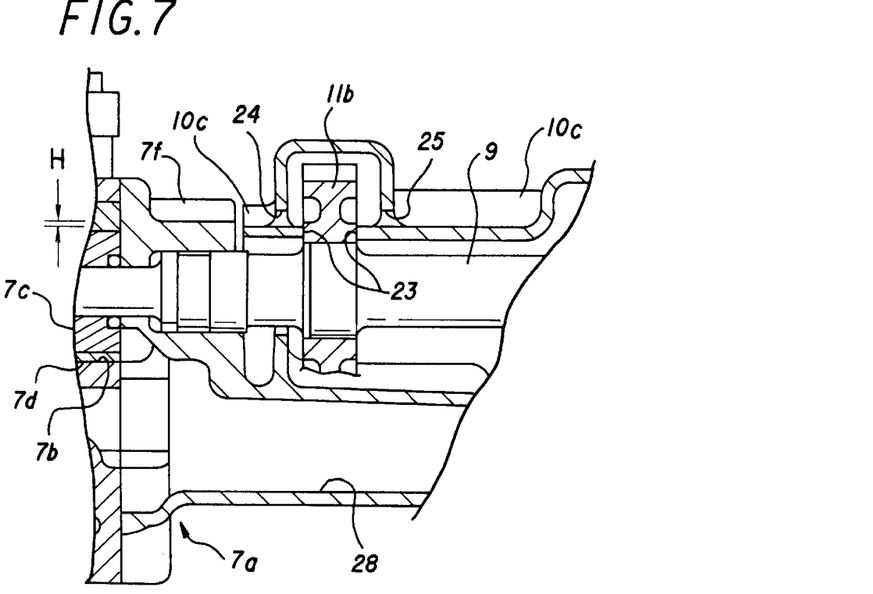
FIG. 7 is an enlarged view showing a main part of FIG. 5.
Figure 8:
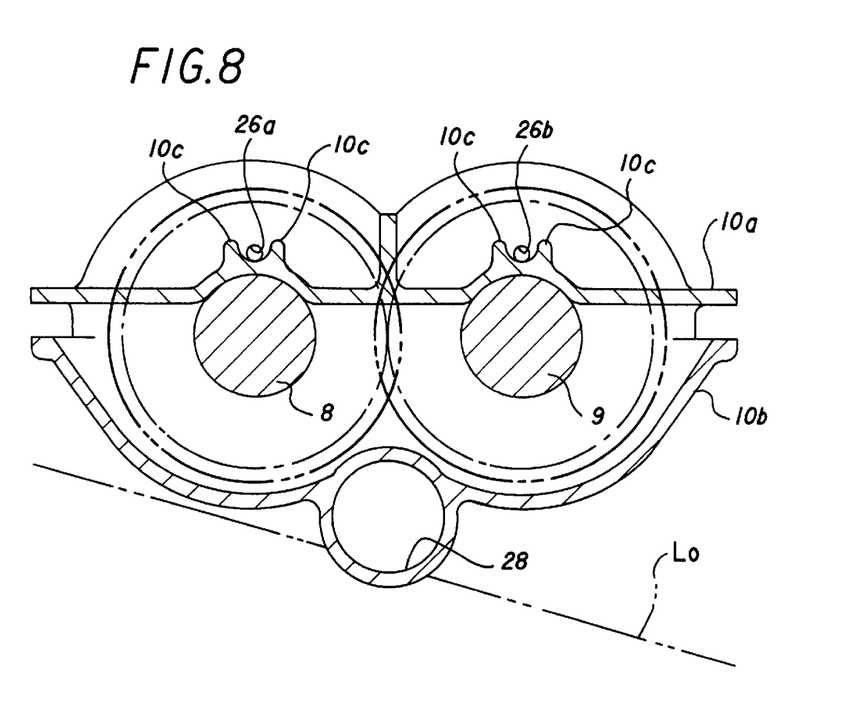
FIG. 8 is a sectional view taken along the line VIII—VIII of FIG. 5.
Figure 9:
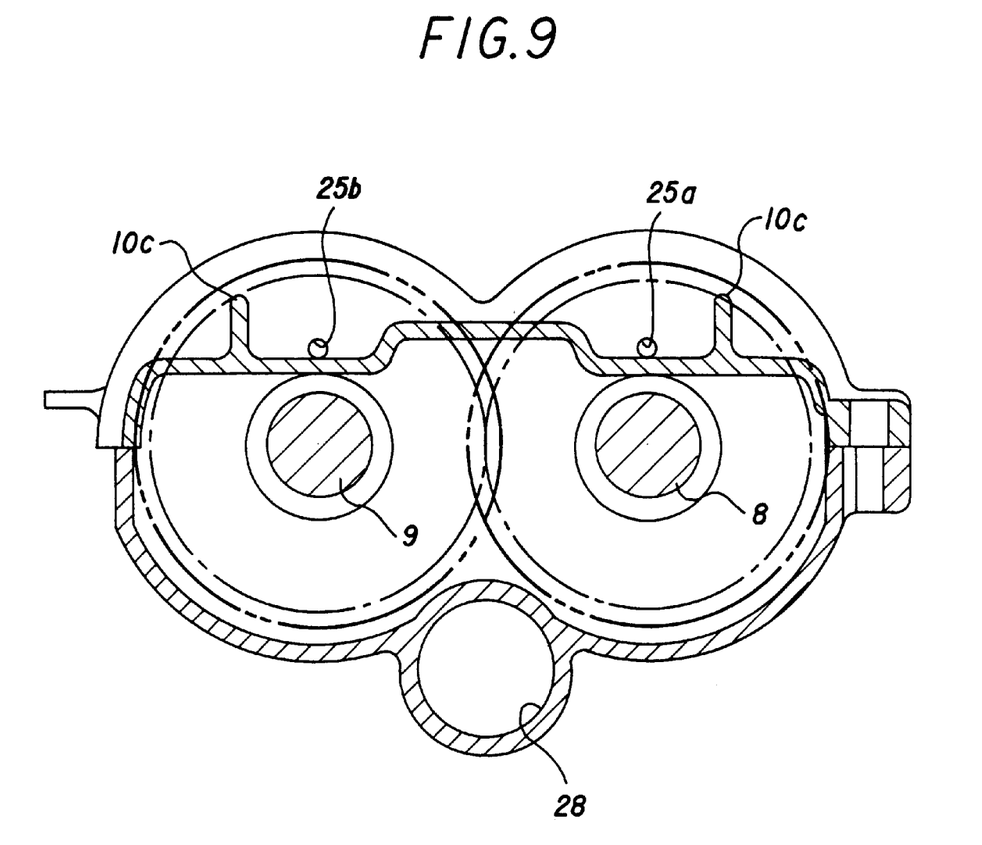
FIG. 9 is a sectional view taken along the line IX—IX of FIG. 5.

As shown in FIG. 5, FIG. 7 showing an enlarged view of the main portion shown in FIG. 5, FIG. 8 showing a view taken along the line VIII—VIII of FIG. 7 and FIG. 9 showing a view taken along the line IX—IX of FIG. 7, portions of the upper casing 10*a* which cover the gears 11*a*, 11*b* constitute thrust bearings 22, 23 and abut against axial ends of the gear 11*a* made integral with the balance shaft 8. These portions of the upper casing 10*a* which cover the gears 11*a*, 11*b* are swelled outwardly, in particular, upwardly, and oil passages 24, 25 are formed in front and rear surfaces of these swelled portions so as to communicate with an upper surface (outer surface) of the upper casing 10*a*. Ribs 10*c* extending in longitudinal directions are formed on the outer surface of the upper casing 10*a* with which the oil passages 24, 25 are caused to communicate in such a manner as to surround the periphery thereof, so that oil flying or dripping from the engine into between the ribs 10*c* or an oil reservoir is led to the oil passages 24, 25 for supply to the gears 11*a*, 11*b* and the thrust bearings 22, 23 in a preferred fashion. In addition, it is needless to say that the ribs 10*c* improve the rigidity of the upper casing 10*a*, and in particular, as shown in FIG. 5, the rib 10*c* provided between the swelled portion covering the gears 11*a*, 11*b* and the swelled portion covering the balancer weights 8*c*, 8*d*, 9*c*, 9*d* functions to markedly increase the rigidity thereat.

On the other hand, as shown well in FIG. 7, similar ribs 7*f* are also formed on an upper surface of the oil pump body 7*a*, which will be described later. Therefore, oil coming in between these ribs 7*f* or an oil reservoir is also designed to be supplied to the thrust bearings 22, 23 via the upper surface of the upper casing 10*a* and the oil passage 24. Here, the upper surface of the oil pump body 7*a* or a bottom surface of the oil reservoir is raised higher by a height H than the upper surface of the upper casing 10*a* adjacent thereto or a bottom surface of the oil reservoir. As a result of this, even if there is a minor error in assembling, a sufficient amount of oil can be supplied to the thrust bearings 22, 23.

Figure 6:
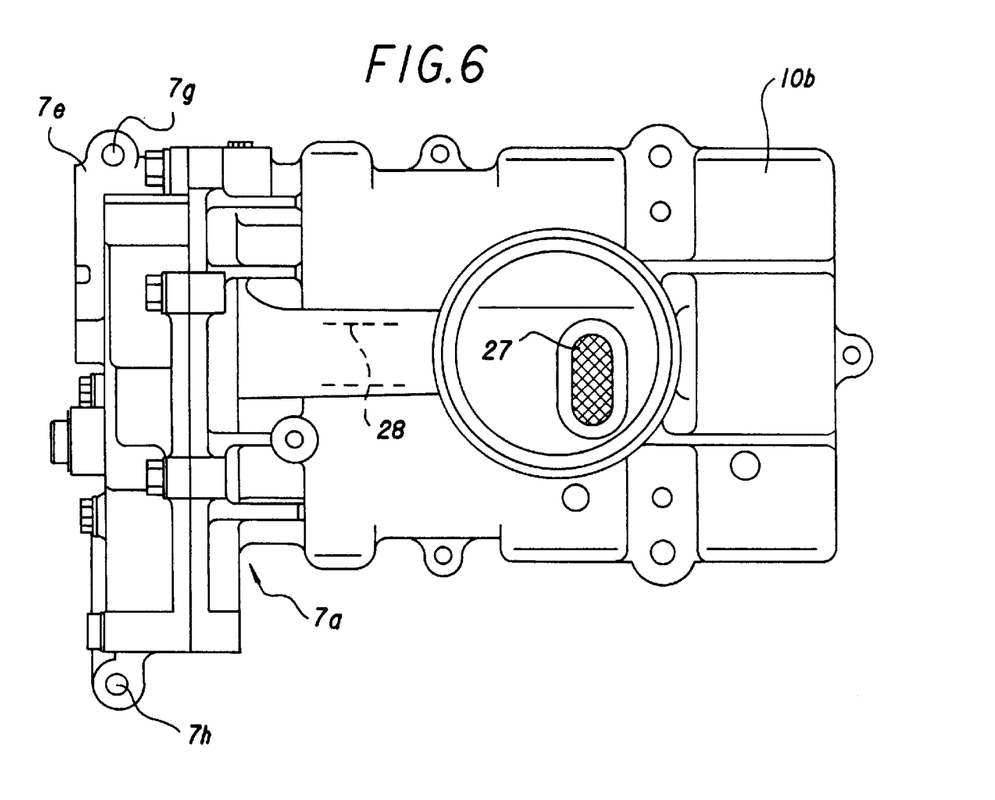
FIG. 6 is a bottom view of a secondary balancer device to which the present invention is applied.
Figure 10:
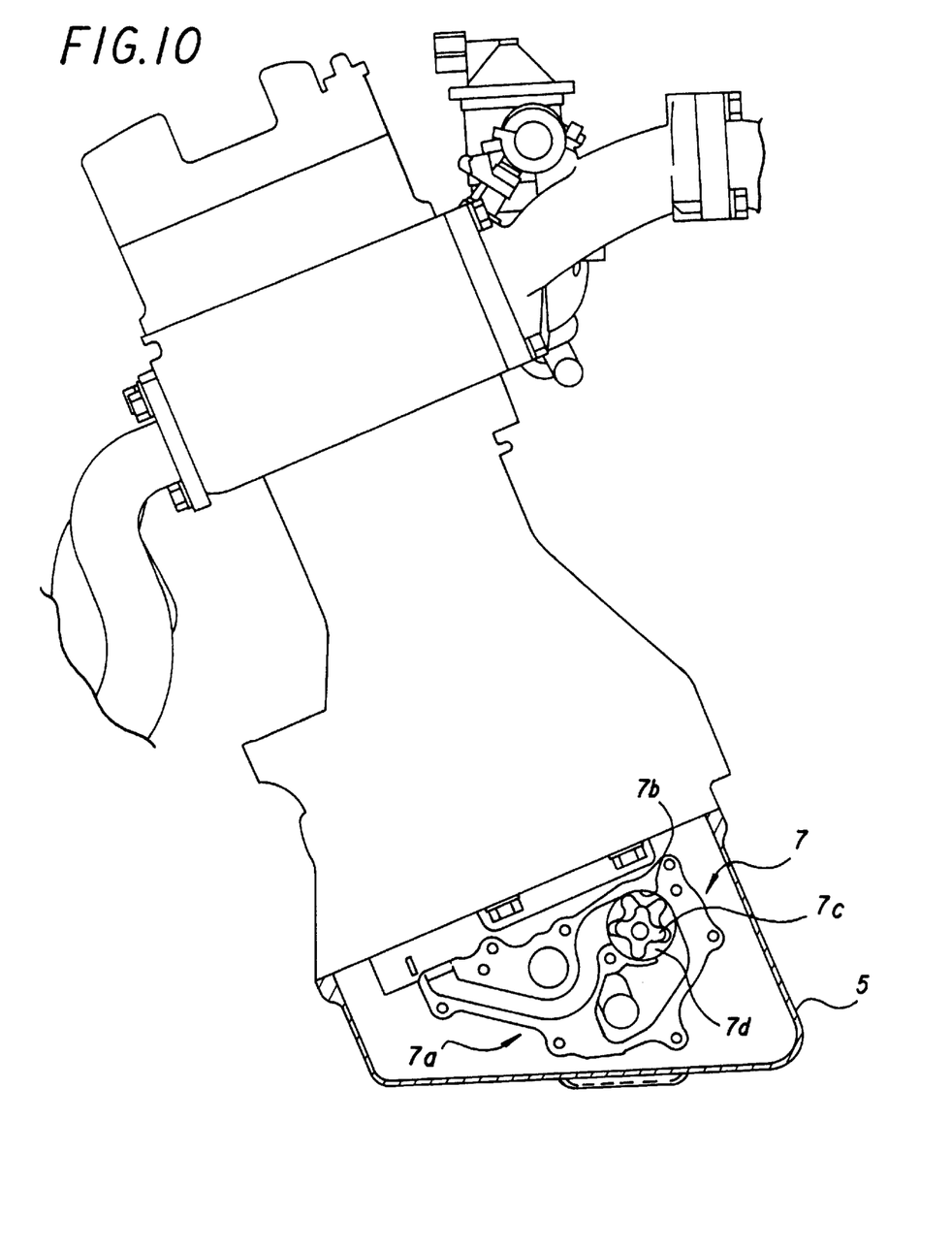
FIG. 10 is a sectional view taken along the line X—X of FIG. 2.

Furthermore, as shown in FIGS. 5, 6 and 10, the oil pump body 7*a* of the oil pump 7 is formed integrally with the lower casing 10*b*. The other balance shaft 9 is inserted into an oil pump chamber 7*b* of the oil pump body 7*a* at one end portion, and an inner rotor 7*c* of a trochoidal pump is attached thereto. The pump chamber 7*b* and a part of the oil passage are defined by combining the innter rotor 7*c* and an outer rotor 7*d*, and aligning a pump cap 74 with the body for assembly thereto. Then, this pump cap 7*e* is fastened to the lower block 4 with bolts as a second fastening means. The bolts as the second fastening means are respectively inserted into bolt fastening holes 7*g* and 7*h* which are formed on the pump cap 7*e*. This, in cooperation with the through bolts as the first fastening means, completes the fixation of the secondary balancer device 6 and the oil pump 7 to the lower block 4. This allows the fastened portions to be spaced farther away from each other than in a case where the fastening to the lower block is effected only at the casing of the secondary balancer device 6, whereby even if any errors in accuracy at which the mounting surfaces to the lower block 4 (cylinder block) are processed, they can be absorbed to such an extent that the errors do not affect the balance shafts 8, 9.

In this state, the inner rotor 7*c* actually sucks up oil in the oil pan 5 from an oil strainer 27 provided at a lower portion of the lower casing 10b via an oil introduction passage 28 in cooperation with the outer rotor 7d so as to supply oil so sucked to the respective portions of the engine.

Here, as shown in FIG. 6 and FIGS. 8 to 10, the oil introduction passage 28 extending from the oil strainer 27 to the oil pump chamber 7b is formed at a lower end of the lower casing 10b integrally therewith, this reinforcing the lower casing 10b. In addition, the oil introduction passage 28 extends between the balance shafts 8, 9 in substantially paralell with the axes thereof, and is allowed to enter between the two balance shafts 8, 9. Accordingly, the oil introduction passage 28 does not have to be swelled downwardly by a large swelling amount, so that the downward selling amount can be reduced. This can make the entire construction smaller.

Now, by the expression made above, "between the balance shaft 8 and the balance shaft 9" or "between the balance shafts 8, 9," it is meant that a part of the oil introduction passage 28 is disposed at the largest-diameter portions of the balance shafts or on the upper side of a tangent Lh common to rotating loci of the balancer weights 8c, 8d, 9c, 9d, or on the axial center side of the balance shafts 8, 9. This can be said about the expression, "between the gears 11a, 11b."

In addition, as shown in FIG. 8, the oil introduction passage 28 is defined by swelling the bottom wall of the lower casing 10b in directions toward between the two balance shafts 8, 9 and the bottom side of the oil pan 5. This restrains the downward swelling of the passage and also prevents the swashing of oil in the oil pan 5 since a lower swelled portion of the passage is in contact with the oil level Lo of oil in the oil pan 5.

Figure 11:
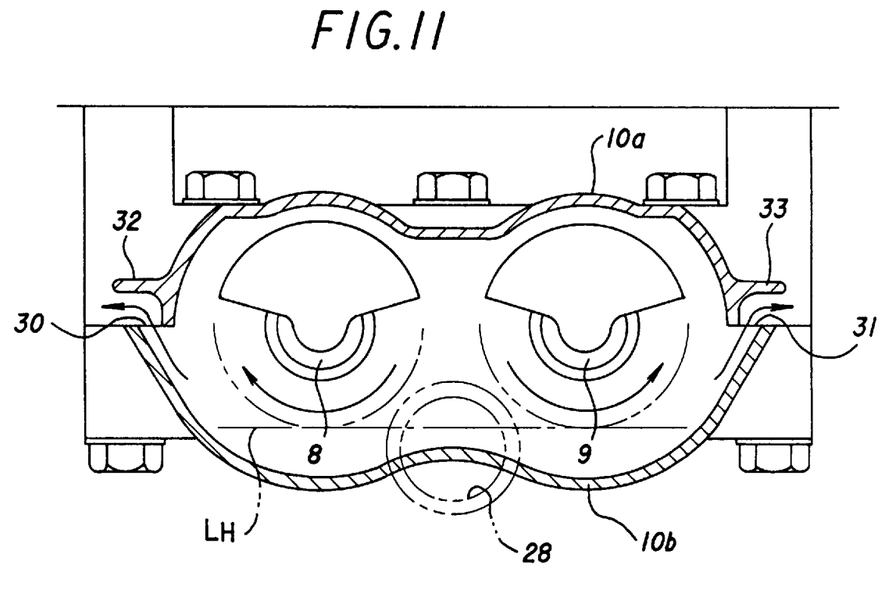
FIG. 11 is a sectional view taken along the line XI—XI of FIG. 2.

On the other hand, as shown well in FIG. 11 openings 30, 31 are formed between the upper and lower casings 10a, 10b at portions where the balancer weights 8c, 8d, 9c, 9d are located in such a manner as to be opened upwardly. This allows the respective balancer weights 8c, 8d, 9c, 9d to discharge oil reserved at the bottom of the lower casing 10b from the openings 30, 31 to the outside of the casing as the two balance shafts 8, 9 rotate. In addition, upper portions of these openings 30, 31 are covered, respectively, with elongated projections which also function as a reinforcing rib, with a gap being maintained therebetween, whereby unnecessary oil is prevented from entering the casing from the engine E main body.

Figure 12:
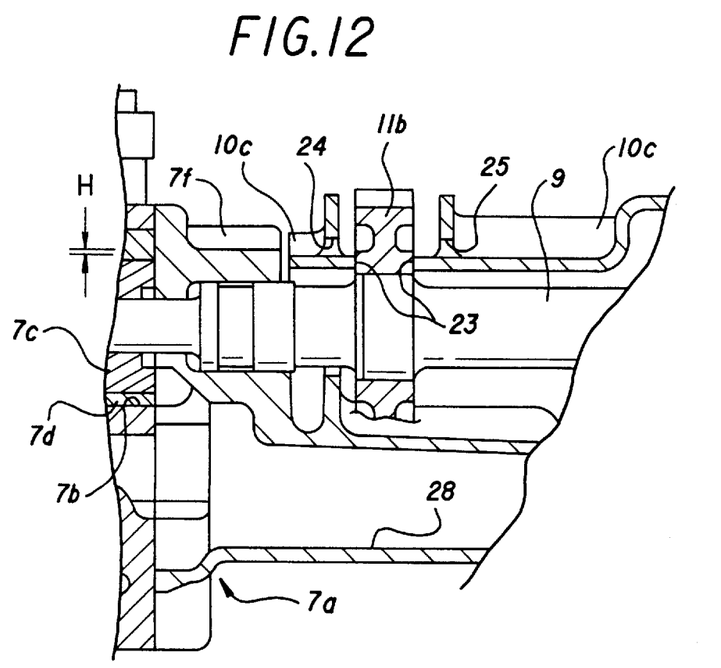
FIG. 12 shows enlarged view shown in a main part of the engine as a modified embodiment shown in FIGS. 5 and 7.

In addition to this, FIG. 12 shows enlarged view shown in a modified main part of the engine as a modified embodiment shown in FIGS. 5 and 7.

As shown in FIG. 12, the upper casing 10a has flange portions which are upwardly raised respectively, so as to only cover the side surfaces of the gears 11a and 11b and to open the upper portion of the gears 11a and 11b. With this structure, it becomes easy to form a thrust bearing 23 and also to increase an amount of the lubricant supplied to the thrust bearing 23. Since the remain components containing the oil passages 24, 25 are the same as the embodiment shown in FIGS. 5 and 7, an explanation of the same is eliminated herein.

As is clear from the above description, since the balance shaft supporting structure according to the present invention is constructed such that a casing accommodating therein a pair of balance shafts below the cylinder block comprises an upper casing and a lower casing that can vertically be split, such that an oil pump body is molded integrally with one of the upper and lower casings, in that one end of each of the two casings is inserted into the oil pump body for support therein, and in that the two balance shafts are each supported on a bearing provided between the two casings in such a manner as to be split into two halves at an intermediate portion or the other end thereof, the oil pump body can be molded together with the casing, thereby making it possible to reduce the number of components used and assembly man hours. In addition, since one of the bearings can be split into two halves, when compared with other portions of the balance shafts, the journal portion can be thinned to such an extent that the strength thereof can be secured, thereby making it possible not only to reduce the sliding friction but also to make the casing smaller in size and lighter in weight. More over, the degree of freedom of designing balance shafts can also be improved. In addition, since an oil pump body is molded integrally with the lower casing and the upper and lower casings are fastened to the cylinder block with a first fastening means, with an oil pump cap attached to the oil pump body from a side opposed to the upper casing being fastened to the cylinder block with a second fastening means, the distance between the first and second means can be lengthened as long as possible, thereby making it easy to absorb errors in processing respective mounting surfaces of the upper casing and oil pump cap to the cylinder block.

The present invention is based on Japanese Patent Application No. Hei. 10-228150, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A balance shaft supporting structure for an engine comprising:

a casing accommodating therein a pair of balance shafts and disposed below a cylinder block of the engine, wherein said casing comprises an upper casing and a lower casing vertically split from each other, an oil pump body is integrally molded with one of said upper and lower casings as a one-piece unit, and one end of each of said balance shafts is inserted into and supported by said oil pump body; and bearings provided between said upper and lower casings for respectively supporting said balance shafts, each of said bearings being disposed at at least one of an intermediate portion and the other end of said at least one of the balance shafts in an axial direction of said balance shaft, and each of said bearings comprising at least two segments.

2. The balance shaft supporting structure according to claim 1, further comprising:

a first fastening means for fastening said upper and lower cases; and a second fastening means for fastening said cylinder block with an oil pump cap attached to said oil pump body from a side opposed to said upper casing, wherein said oil pump body is integrally molded with said lower casing.

3. The balance shaft supporting structure according to claim 2, further comprising:

a third fastening means for fastening said upper and lower casings, wherein said third fastening means is disposed between said bearings which are respectively interposed between a pair of balancer weights formed on the respective balance shafts.

4. The balance shaft supporting structure according to claim 1, further comprising:

a first fastening means for simultaneously fastening said upper and lower cases to said cylinder block; and a second fastening means for fastening said cylinder block with an oil pump cap attached to said oil pump body from a side opposed to said upper casing, wherein said oil pump body is integrally molded with said lower casing.

5. A balance shaft supporting structure, for an engine comprising:

a casing accommodating therein a pair of balance shafts and disposed below a cylinder block of the engine, wherein said casing comprises an upper casing and a lower casing vertically split from each other, an oil pump body is integrally provided with one of said upper and lower casings, and one end of at least one of said balance shafts is inserted into and supported by said oil pump body;

bearings provided between said upper and lower casings for respectively supporting said balance shafts, each of said bearings being disposed at least one of an intermediate portion and the other end of said at least one of the balance shafts in an axial direction of said balance shafts, and each of said bearings comprising at least two segments, wherein said pair of balance shafts are intermeshed with each other through gears, and said upper casing has portions abutting against axial ends of each of said gears so as to constitute thrust bearings, wherein a plurality of ribs each extending in the axial direction of the balance shafts are formed on the outer surface of said upper casing, and flange portions which are upwardly raised and disposed at portions substantially surrounding said gears are formed on said upper surface of said upper casing, and wherein said flange portions respectively comprise oil passages for supplying into said thrust bearings oil which is dripped from said engine and then stored between a pair of ribs among said plurality of ribs.

6. The balance shaft supporting structure according to claim 5, wherein a plurality of additional ribs extended in the axial direction of said balance shaft are formed on an upper surface of said oil pump body, and wherein said upper surface of said oil pump body is disposed in adjacent to said upper surface of said upper casing in such a manner that an oil stored between a pair of additional ribs among said plurality of additional ribs can be supplied into said thrust bearings through said oil passages and said upper surface of said upper casing.

7. The balance shaft supporting structure according to claim 5, wherein said upper casing only covers the side surfaces of said gears.

8. A balance shaft supporting structure, for an engine comprising:

a casing accommodating therein a pair of balance shafts and disposed below a cylinder block of the engine, wherein said casing comprises an upper casing and a lower casing vertically split from each other, an oil pump body is integrally provided with one of said upper and lower casings, and one end of at least one of said balance shafts is inserted into and supported by said oil pump body;

bearings provided between said upper and lower casings for respectively supporting said balance shafts, each of said bearings being disposed at least one of an intermediate portion and the other end of said at least one of the balance shafts in an axial direction of said balance shafts, and each of said bearings comprising at least two segments, wherein said oil pump body is integrally provided with one of said upper and lower casings at one end of said balance shafts in the axial direction thereof, and an oil intake portion is provided at a lower portion of said casing, and wherein said structure further comprises:

an oil introduction passage for communicating with said oil intake portion and said oil pump body, said oil introduction passage being disposed at at least one of a first position between said balance shafts in said casing and a second position between gears through which said balance shafts intermeshed with each other.

9. The balance shaft supporting structure according to claim 8, wherein said oil introduction passage is defined by swelling the bottom wall of the lower casing in directions toward between the two balance shafts and the bottom side of an oil pan which is disposed below the cylinder block.

10. A balance shaft supporting structure for an engine comprising:

a casing accommodating therein a pair of balance shafts and disposed below a cylinder block of the engine, wherein said casing comprises an upper casing and a lower casing vertically split from each other, an oil pump body is integrally provided with one of said upper and lower casings, and one end of at least one of said balance shafts is inserted into and supported by said oil pump body;

bearings provided between said upper and lower casings for respectively supporting said balance shafts, each of said bearings being disposed at least one of an intermediate portion and the other end of said at least one of the balance shafts in an axial direction of said balance shafts, and each of said bearings comprising at least two segments; and opening portions opened upwardly and formed between the upper and lower casings for discharging oil reserved at the bottom of the lower casing to the outside of the casing, said opening portions being disposed both side of said balance shafts.

11. The balance shaft supporting structure according to claim 10, wherein said opening portions are covered by reinforce ribs respectively which are formed on said upper casing.

* * * * *